US012583415B2

(12) United States Patent
Sung et al.

(10) Patent No.: US 12,583,415 B2
(45) Date of Patent: Mar. 24, 2026

(54) VEHICLE SEAT HAVING RETRACTOR MOUNTED IN SEAT BACK FRAME

(71) Applicants: Hyundai Motor Company, Seoul (KR); Kia Corporation, Seoul (KR); Autoliv Development AB, Vargarda (SE)

(72) Inventors: Il Chang Sung, Gyeonggi-do (KR); Jung Sang You, Gyeonggi-do (KR); Taek Choon Kim, Gyeonggi-do (KR); Hyeon Ki Hong, Gyeonggi-do (KR); Ho Beom Yoon, Gyeonggi-do (KR); Chan Ki Moon, Gyeonggi-do (KR); Jung Min Lee, Gyeonggi-do (KR)

(73) Assignees: Hyundai Motor Company, Seoul (KR); Kia Corporation, Seoul (KR); Autoliv Development AB, Vargarda (SE)

( * ) Notice: Subject to any disclaimer, the term of this patent is extended or adjusted under 35 U.S.C. 154(b) by 169 days.

(21) Appl. No.: 18/375,904

(22) Filed: Oct. 2, 2023

(65) Prior Publication Data

US 2025/0001970 A1     Jan. 2, 2025

(30) Foreign Application Priority Data

Jun. 28, 2023     (KR) ........................ 10-2023-0083719

(51) Int. Cl.
B60R 22/44     (2006.01)
B60N 2/68     (2006.01)
(Continued)

(52) U.S. Cl.
CPC .............. B60R 22/44 (2013.01); B60N 2/688 (2013.01); B60R 21/01 (2013.01); B60N 2/809 (2018.02); B60R 2022/3402 (2013.01)

(58) Field of Classification Search
CPC .. B60R 2022/3402; B60R 22/44; B60N 2/688
See application file for complete search history.

(56) References Cited

U.S. PATENT DOCUMENTS 3,091,496 A * 5/1963 Bentley ................... B60R 22/26
297/478
5,609,396 A * 3/1997 Loxton ................... B60R 22/26
297/483
(Continued)

FOREIGN PATENT DOCUMENTS

CN         215204794 U * 12/2021 ............. B60N 2/688
CN         113895392 A * 1/2022
(Continued)

*Primary Examiner* — Timothy J Brindley
(74) *Attorney, Agent, or Firm* — Fox Rothschild LLP

(57)     ABSTRACT

A vehicle seat includes: a seat back frame constituting a framework of the vehicle seat; a retractor received in an internal space of the seat back frame; and headrest poles which vertically extend through the retractor and are mounted to the retractor. The retractor may be mounted at an upper end of the seat back frame. By mounting the retractor within the seat back frame, instead of a separate mounting space, the thickness of the seat back in the forward/backward directions may be reduced, thereby thinning the seat and enlarging the passenger compartment.

17 Claims, 11 Drawing Sheets

(51) Int. Cl.
  _B60R 21/01_   (2006.01)
  _B60N 2/809_   (2018.01)
  _B60R 22/34_   (2006.01)

(56)    References Cited

U.S. PATENT DOCUMENTS

| | | | | |
|---|---|---|---|---|
| 6,290,299 | B1 * | 9/2001 | Frisch | B60N 2/02246 |
| | | | | 297/483 |
| 6,767,055 | B1 * | 7/2004 | Sparks | B60N 2/162 |
| | | | | 297/216.13 |
| 9,302,645 | B1 * | 4/2016 | Shenaq | B60N 2/2803 |
| 11,577,687 | B2 * | 2/2023 | Jabusch | B60R 22/3413 |
| 11,945,398 | B2 * | 4/2024 | Muehlenbrock | B60N 2/688 |
| 2004/0262905 | A1 * | 12/2004 | Herberg | B60R 22/02 |
| | | | | 280/808 |
| 2005/0121897 | A1 * | 6/2005 | Elizondo | B60R 22/02 |
| | | | | 280/808 |

| | | | | |
|---|---|---|---|---|
| 2008/0309111 | A1 * | 12/2008 | Marriott | B60N 2/688 |
| | | | | 280/808 |
| 2016/0347225 | A1 * | 12/2016 | Hayashi | B60N 2/688 |
| 2017/0259719 | A1 * | 9/2017 | Hamano | B60N 2/64 |
| 2018/0370482 | A1 * | 12/2018 | Tago | B60N 2/64 |
| 2020/0047711 | A1 * | 2/2020 | Jabusch | B60R 22/46 |
| 2020/0331371 | A1 * | 10/2020 | Yilma | B60R 22/18 |

FOREIGN PATENT DOCUMENTS

| | | | | | |
|---|---|---|---|---|---|
| DE | 19745634 | A1 | * | 4/1999 | B60N 2/688 |
| DE | 102015205306 | A1 | * | 10/2015 | B60N 2/5825 |
| DE | 102019205307 | A1 | * | 10/2020 | B60R 22/26 |
| DE | 102022132183 | A1 | * | 6/2024 | B60R 22/26 |
| GB | 2464986 | A | * | 5/2010 | B60N 2/245 |
| JP | 2010269733 | A | * | 12/2010 | B60N 2/688 |
| KR | 10-2019-0128994 | A | | 11/2019 | |
| KR | 10-2021-0039433 | A | | 4/2021 | |
| KR | 20250017935 | A | * | 2/2025 | |
| KR | 20250017936 | A | * | 2/2025 | |

* cited by examiner

VEHICLE SEAT HAVING RETRACTOR MOUNTED IN SEAT BACK FRAME

CROSS-REFERENCE TO RELATED APPLICATION

This application claims under 35 U.S.C. § 119(a) the benefit of Korean Patent Application No. 10-2023-0083719, filed on Jun. 28, 2023 in the Korean Intellectual Property Office, the entire contents of which are incorporated herein by reference.

BACKGROUND

1. Technical Field

The present disclosure relates to a vehicle seat, more particularly, to the vehicle seat in which a retractor is mounted in a seat back frame and headrest poles extend through the retractor.

2. Description of the Related Art

In general, a vehicle is provided with seats, where each vehicle seat is composed of a seat back configured to support the upper body of a passenger, a seat cushion configured to support the lower body of the passenger, and a headrest configured to support the head of the passenger.

A vehicle is provided with a seat belt device, which is configured to constrain and protect the upper body of a passenger in the event of an accident.

The seat belt device includes a webbing configured to constrain the shoulders, chest, pelvis and lower body of a passenger (such as a shoulder webbing or a lab webbing), and a retractor configured to wind the webbing.

Because a conventional vehicle seat equipped with a retractor is constructed such that a separate back frame is additionally mounted on the existing seat back frame and a retractor is coupled to the separate back frame, there is a disadvantage of increasing the overall thickness of the seat back in forward/backward directions. Furthermore, there is a disadvantage of relatively narrowing a passenger compartment due to the increased thickness of the seat back and thus deteriorating ride quality.

Details described as the background art are intended merely for the purpose of promoting an understanding of the background of the present disclosure and should not be construed as an acknowledgment of the prior art that is already known to those of ordinary skill in the art.

SUMMARY

Therefore, the present disclosure provides a vehicle seat composed of a seat back equipped with a retractor, in which the retractor is received and mounted in an upper end of the seat back frame, and headrest poles extend through the retractor, thereby thinning the seat back and relatively widening a passenger compartment by virtue of the thinned seat back to improve ride quality.

In accordance with the present disclosure, the above and other objects can be accomplished by the provision of a vehicle seat including a seat back frame constituting a framework of the vehicle seat, and a retractor received in an internal space of the seat back frame.

The vehicle seat may be arranged at an upper end of the seat back frame.

The vehicle seat may further include headrest poles which vertically extend through the retractor and are mounted thereto.

The seat back frame may include a pair of side frames, which are laterally spaced apart from each other and vertically extend, and an upper end cross member connecting upper ends of the pair of side frames to each other in a lateral direction, and the retractor may be received in a space beneath the upper end cross member and may be fixedly coupled to the pair of side frames and the upper end cross member.

The retractor may include a first central mount unit on which a pre-tensioner and a self-correction sensor are mounted, a second mount unit which is positioned at one side of the first mount unit and on which a spool and a load limiter are mounted, and a third mount unit which is positioned at another side of the first mount unit and on which a pre-tensioner is mounted, and the headrest poles may respectively extend through a space between the first mount unit and the second mount unit and a space between the first mount unit and the third mount unit and may be mounted thereto.

Regions of the headrest poles which extend through the retractor may be surrounded and protected by a retractor frame.

The vehicle seat may further include a webbing guide which is rotatably coupled to one side of the upper end of the seat back frame and through which a webbing extends.

The webbing having passed through the webbing guide may be positioned at an outer side of a seat bolster when the webbing is not worn by a passenger in an initial state, and may be drawn out of the vehicle seat in an inward direction in which the webbing is worn by the passenger due to rotation of the webbing guide when the webbing is worn by the passenger, and the webbing guide and the webbing may be restored to the initial state by rotation thereof caused by spring force of the retractor and weight of the webbing guide when the worn state of the webbing is released.

The seat back frame may have a webbing port, which is vertically formed through the upper end of the seat back frame and through which a webbing is moved.

The webbing port may include one webbing port formed at one of the right side and the left side of the upper end of the seat back frame or two webbing ports formed both at the right side and left side of the upper end of the seat back frame.

A guide may be coupled to a periphery of the webbing port in order to prevent direct contact between the webbing and the webbing port.

The webbing port may have a front width greater than a rear width when a passenger sitting on the vehicle seat has a body size equal to or larger than an average body size of adult humans.

The webbing port may have a rear width greater than a front width when a passenger sitting on the vehicle seat has a body size smaller than an average body size of adult humans.

In accordance with the present disclosure, a vehicle seat may include: a seat back frame constituting a framework of the vehicle seat; a retractor received in an internal space of the seat back frame; and headrest poles which vertically extend through the retractor and are mounted to the retractor.

In according with the present disclosure, a vehicle may include the above-described vehicle seat.

BRIEF DESCRIPTION OF THE DRAWINGS

The above and other objects, features and other advantages of the present disclosure will be more clearly under-

Figure 1:
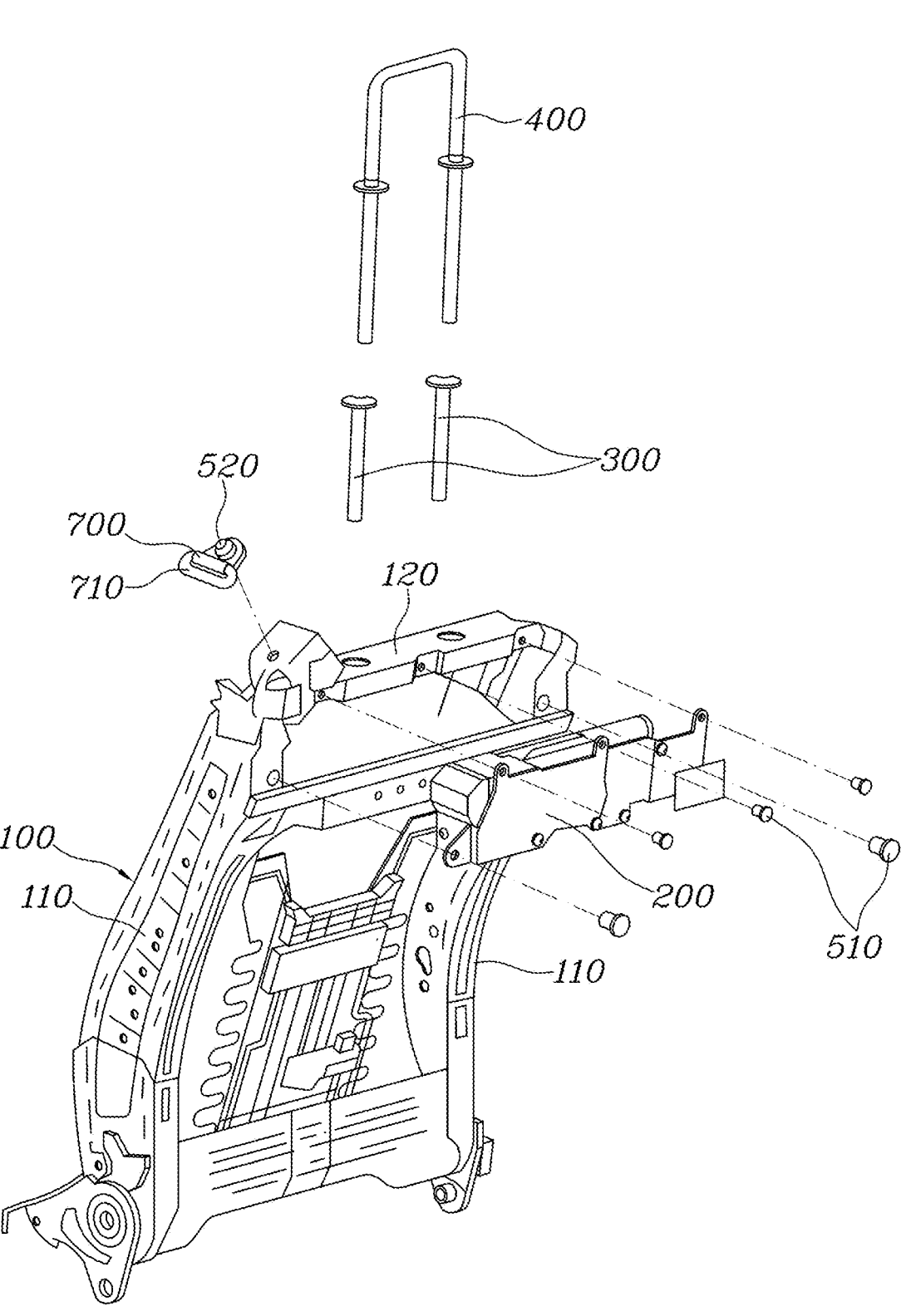
Figure 2:
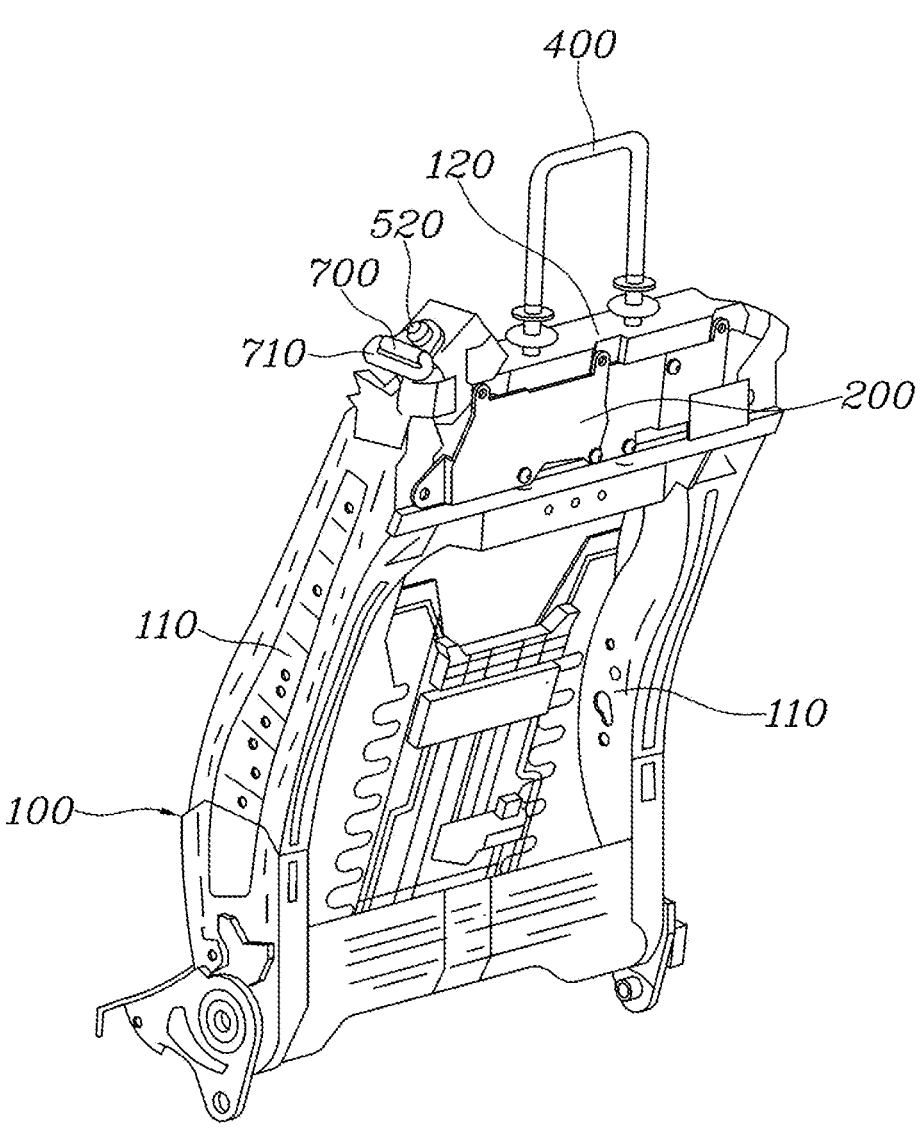
Figure 3:
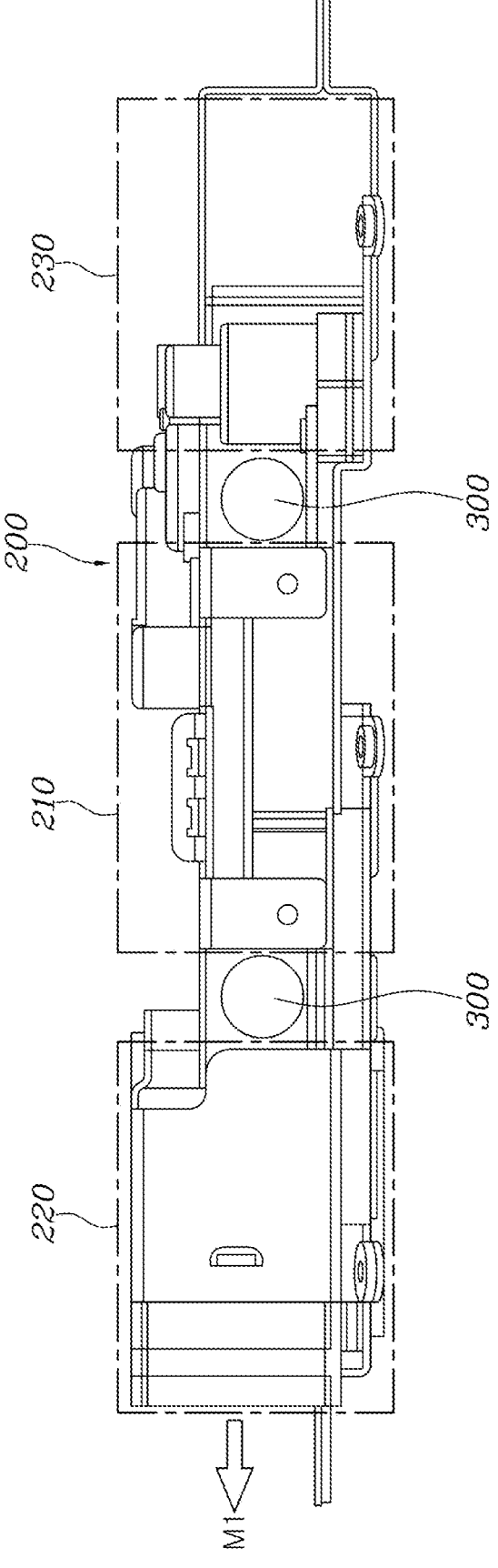
Figure 4:
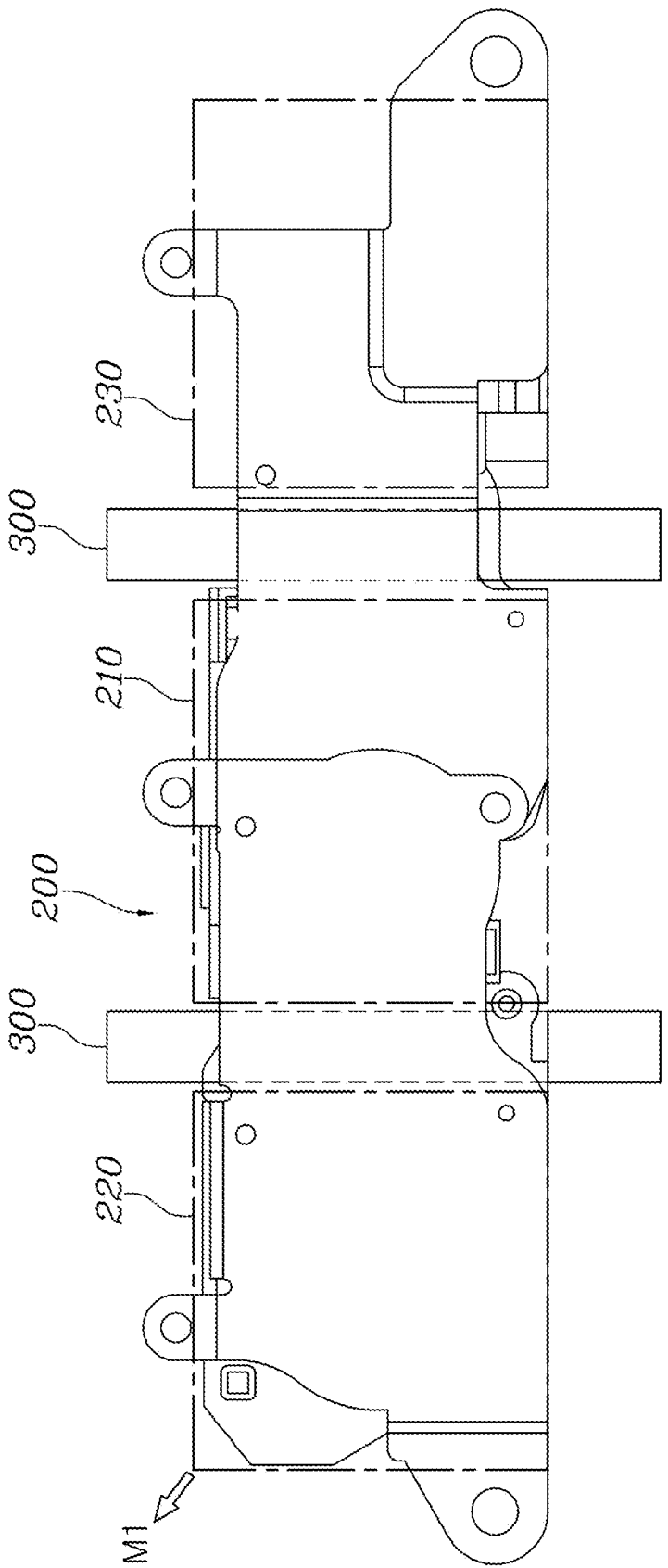
Figure 5:
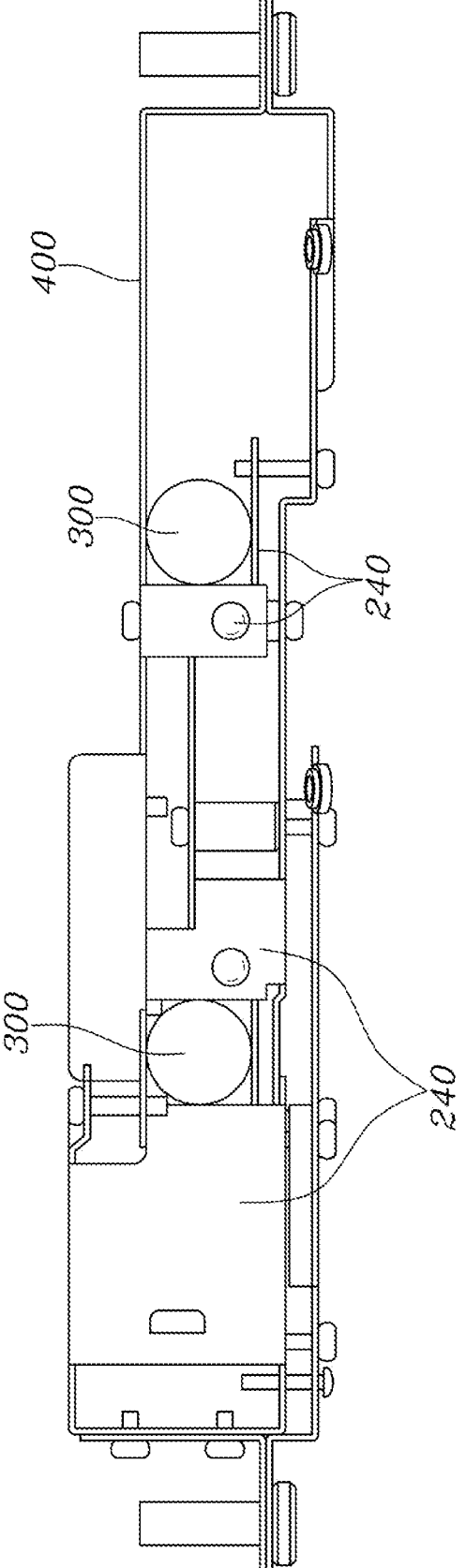
Figure 6:
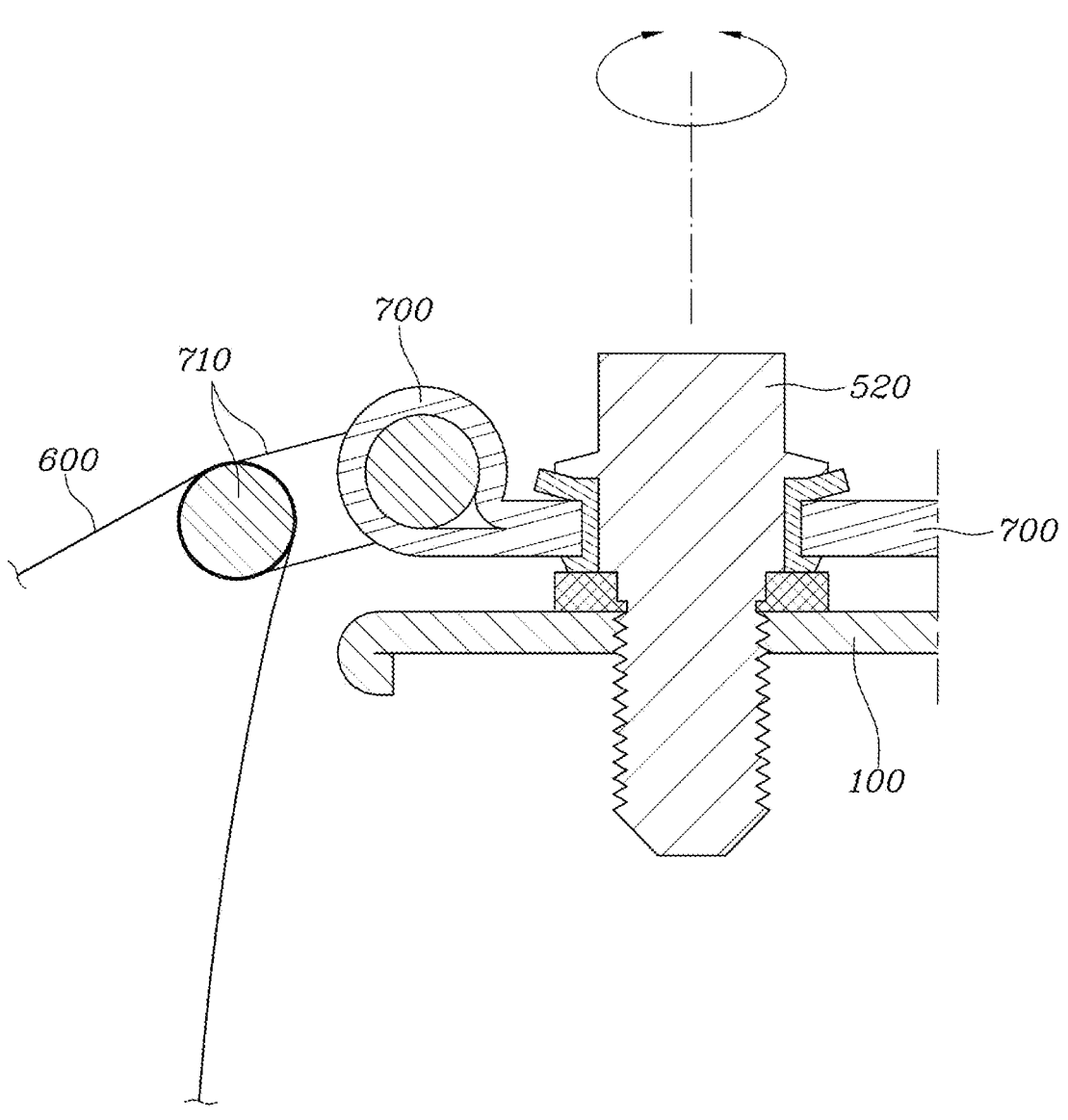
Figure 7:
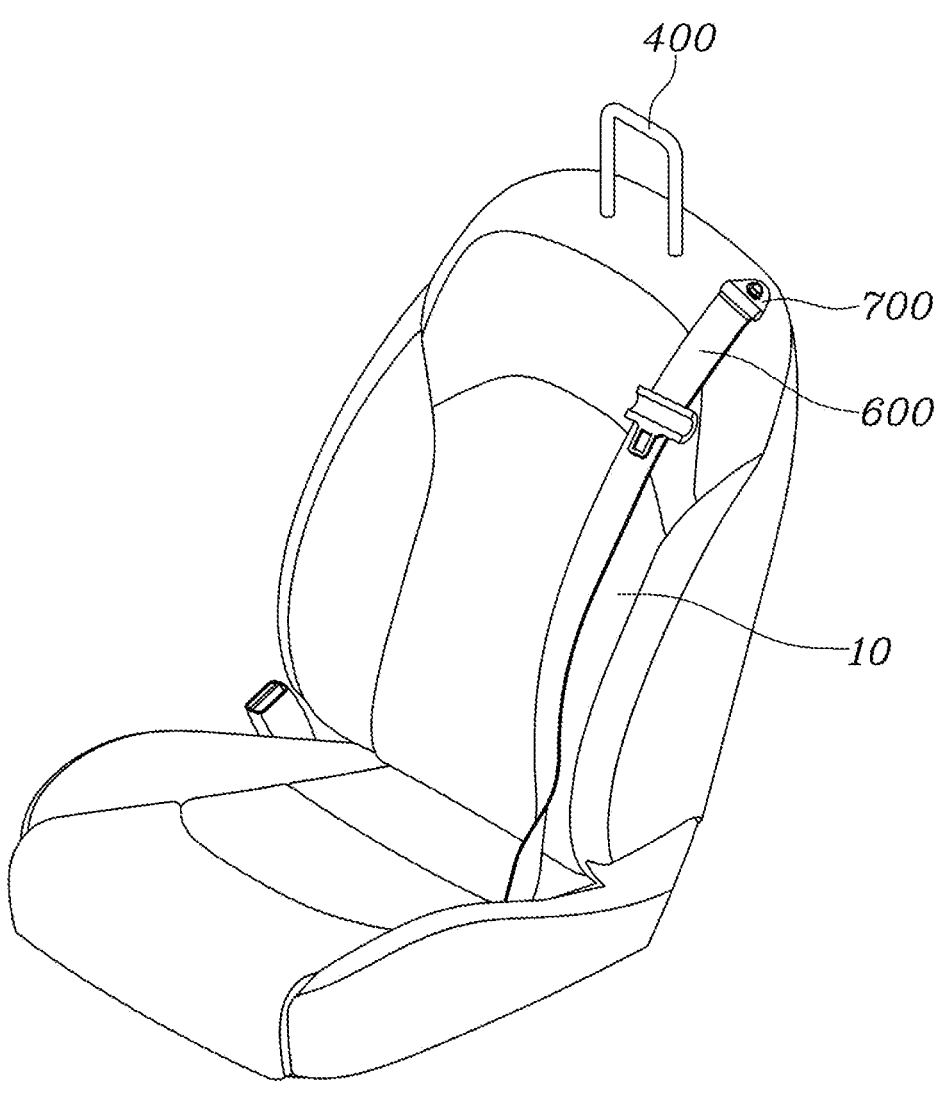
Figure 8:
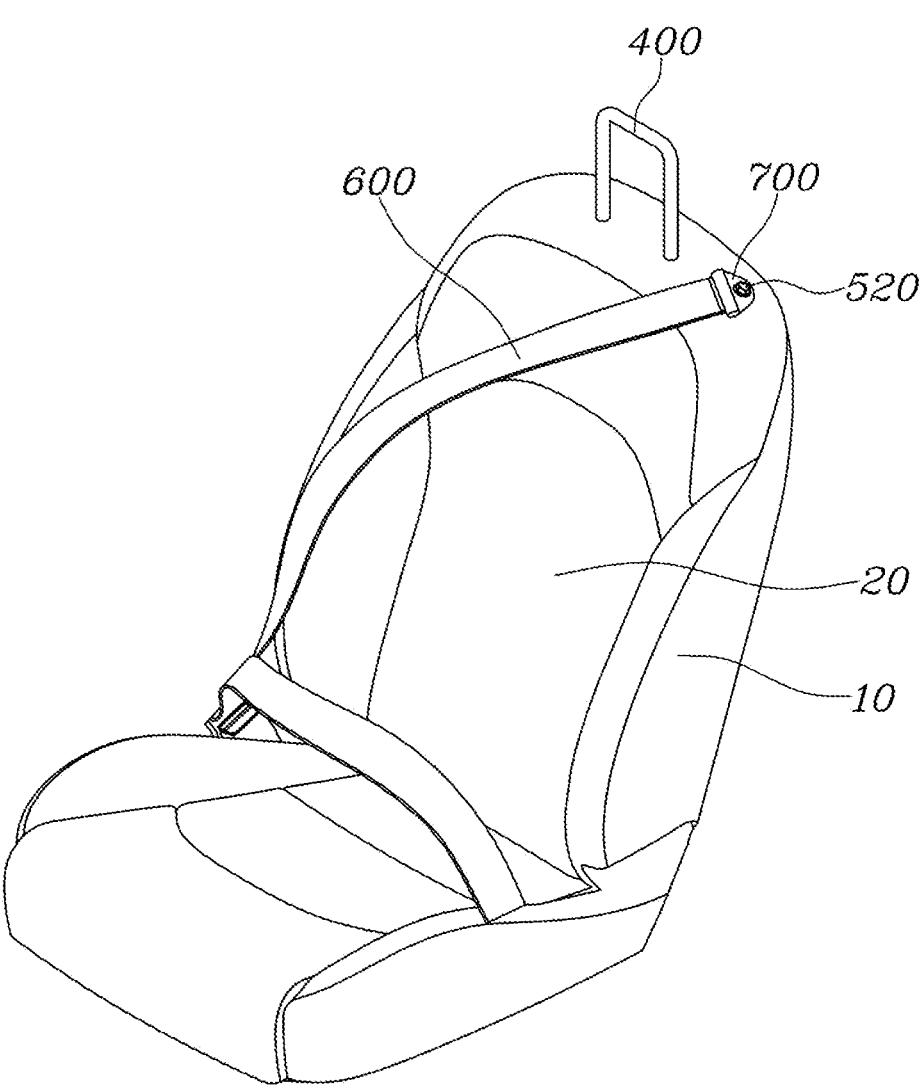
Figure 9:
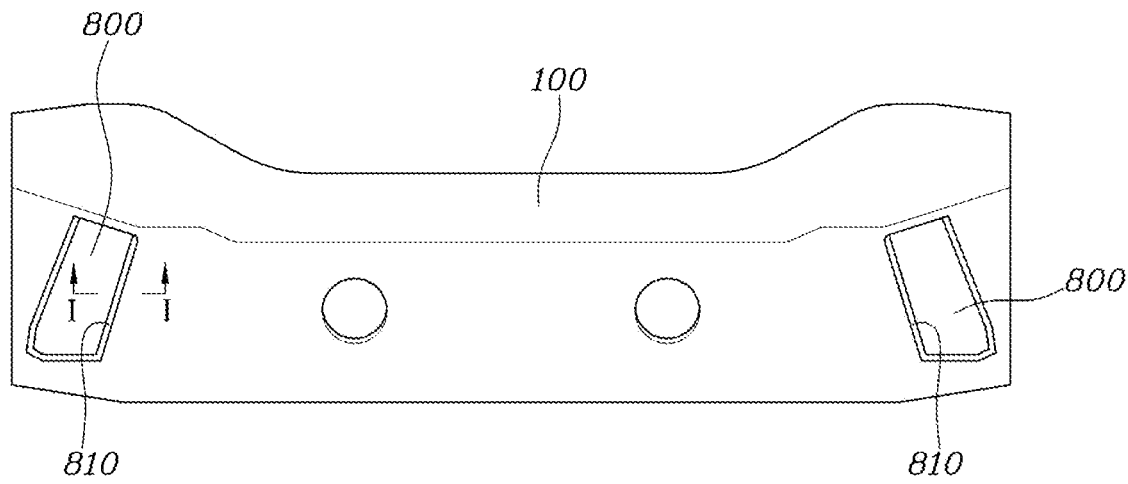
Figure 10:
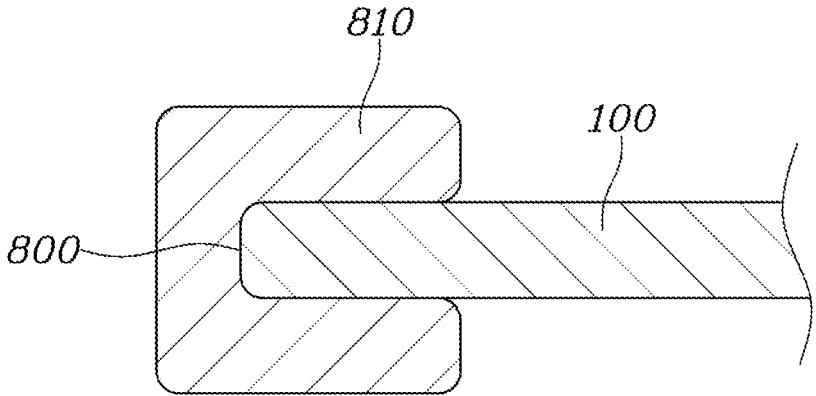
Figure 11:
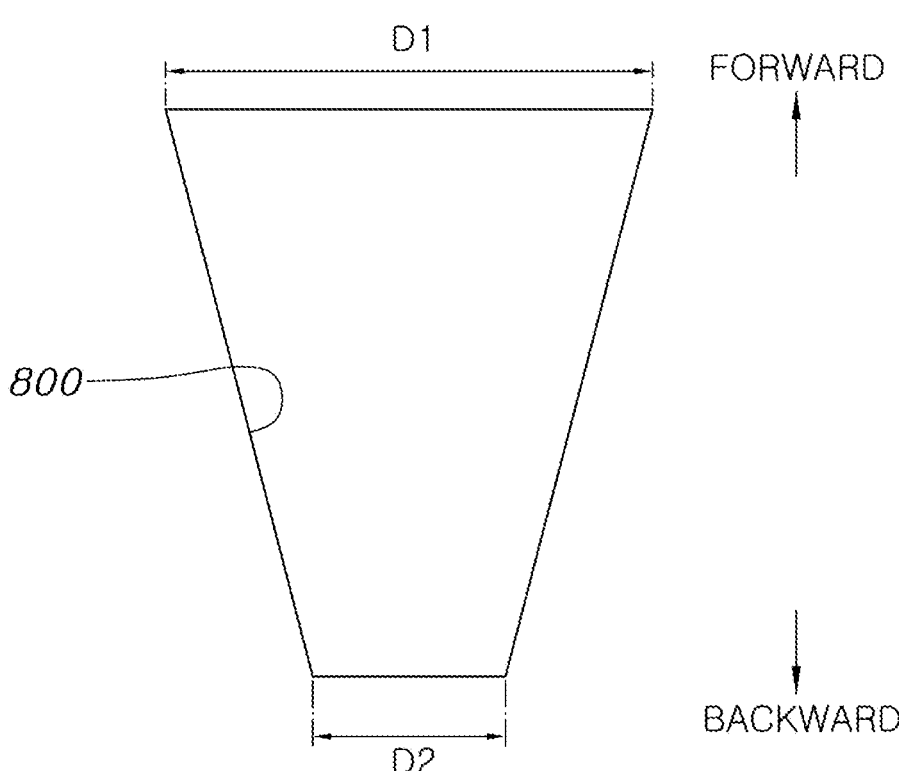
Figure 12:
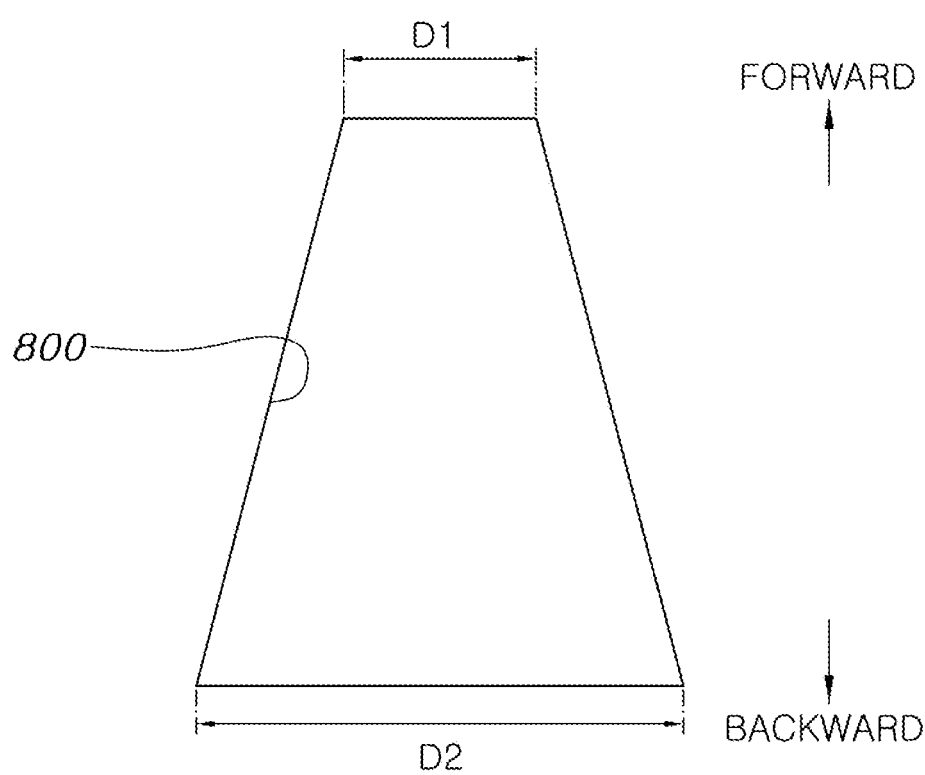

3 stood from the following detailed description taken in conjunction with the accompanying drawings, in which:

FIG. 1 is a view illustrating a state of the vehicle seat according to the present disclosure in which a seat back frame, a retractor and a webbing guide are separated from each other;

FIG. 2 is a view illustrating an assembled state of the vehicle seat shown in FIG. 1;

FIGS. 3 and 4 are a plan view and a front view, respectively, which illustrate a state of the vehicle seat according to the present disclosure in which headrest poles extend through the retractor and are mounted thereto;

FIG. 5 is a view illustrating a state of the vehicle seat according to the present disclosure in which the headrest poles extend through a retractor frame;

FIG. 6 is a view illustrating the vehicle seat according to the present disclosure to which a webbing guide is rotatably mounted;

FIGS. 7 and 8 are views the states of the webbing of the vehicle seat according to the present disclosure before and after the webbing is worn by a passenger;

FIG. 9 is a view illustrating webbing ports formed in the upper frame of the seat back frame according to the present disclosure;

FIG. 10 is a cross-sectional view taken along the line I-I in FIG. 9; and FIGS. 11 and 12 are views illustrating shapes of the webbing ports according to the present disclosure.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural and functional descriptions of embodiments of the present disclosure disclosed herein are provided only for the purpose of illustration of the embodiments of the present disclosure. The present disclosure may be embodied in many different forms without departing from the spirit or significant characteristics of the present disclosure. Therefore, the embodiments of the present disclosure are disclosed only for illustrative purposes, and should not be construed as limiting the present disclosure.

Reference will now be made in detail to various embodiments of the present disclosure, specific examples of which are illustrated in the accompanying drawings and described below, since the embodiments of the present disclosure can be variously modified in many different forms. While the present disclosure will be described in conjunction with exemplary embodiments thereof, it is to be understood that the present description is not intended to limit the present disclosure to those exemplary embodiments. On the contrary, the present disclosure is intended to cover not only the exemplary embodiments, but also various alternatives, modifications, equivalents and other embodiments that may be included within the spirit and scope of the present disclosure as defined by the appended claims.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element, or intervening elements may be present therebetween. In contrast, it should be understood that when an element is referred to as being "directly coupled" or "directly connected" to another element, there are no intervening elements present. Other expressions that describe the relationship between elements, such as "between", "directly between", "adjacent to", or "directly adjacent to", should be understood in the same way.

Unless otherwise defined, all terms including technical and scientific terms used herein have the same meanings as those commonly understood by one of ordinary skill in the art to which this disclosure belongs. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

A control unit (controller) according to an exemplary embodiment of the present disclosure may be embodied by a nonvolatile memory (not shown) configured to store an algorithm configured to control operation of various components of a vehicle or data relating to software instructions for executing the algorithm and a processor (not shown) configured to perform operations, which will be described below, using the data stored in the memory. Here, the memory and the processor may be embodied by separate chips. Alternatively, the memory and the processor may be embodied by a single chip in which the memory and the processor are integrated. The processor may be embodied as one or more processors.

Hereinafter, a vehicle seat according to a preferred embodiment of the present disclosure will be described with reference to the accompanying drawings.

As illustrated in FIGS. 1 to 12, the vehicle seat according to the present disclosure is a retractor-type seat which is integrally equipped with a retractor.

A vehicle seat typically includes a seat back configured to support an upper body of a passenger, a seat cushion configured to support a lower body of the passenger, and a headrest configured to support a head of the passenger.

The vehicle seat includes a structure composed of a seat cushion frame and a seat back frame, which define the skeleton (framework) of the vehicle seat, and a cover member, which covers the structure and is made of a cushioning material.

As provided herein, a vehicle seat according to the present disclosure includes a retractor 200 received in an internal space at an upper end of a seat back frame 100, and headrest poles 300, which vertically extend through the retractor 200.

The seat back frame 100 is a component constituting a framework of the seat back, and the headrest poles 300 are components required to mount the headrest.

According to the present disclosure, two headrest poles 300 vertically extend through the retractor 200 and are coupled to the retractor 200 in a state of being laterally spaced apart from each other, and two ends of a U-shaped headrest stay 400 are respectively inserted into the two headrest poles 300 and are respectively coupled to the headrest poles 300. A cushioning foam member is coupled to the center region of the headrest stay 400, which projects upwards, so as to constitute the headrest.

With the development of a smart vehicle, improvement and diversification in functions of a vehicle seat are required, and various components are mounted on the vehicle seat for improving one or more functions of the vehicle seat. As used herein, the term "vehicle seat" and "seat" are interchangeable.

Accordingly, in the case of the vehicle seat equipped with the retractor 200, there is a problem whereby the installation space required to mount the retractor increasingly becomes narrow.

The vehicle seat according to the present disclosure is constructed such that the retractor 200 is internally mounted in the upper end of the seat back frame 100. Consequently, the thickness of the seat back in the forward/backward directions is reduced, thereby thinning the vehicle seat. By virtue of the thinned seat back, there is an advantage in that the passenger compartment required to accommodate therein passengers is relatively enlarged, thereby helping to improve ride quality.

Furthermore, since the vehicle seat according to the present disclosure is constructed such that the headrest poles 300 vertically extend through the retractor 200 and are mounted thereto, there is an advantage in that it is unnecessary to additionally provide the upper end of the seat back with an installation space for the headrest poles 300, thereby also helping in thinning the seat back.

According to the present disclosure, the seat back frame 100 includes a pair of side frames 110, which are laterally spaced apart from each other and vertically extend, and an upper end cross member 120 connecting the upper ends of the pair of side frames 110 to each other in a lateral direction.

The retractor 200 is inserted into the space beneath the upper end cross member 120, and is fixedly coupled to the side frames 110 and the upper end cross member 120.

The retractor 200 is fixedly coupled to the side frames 110 and the upper end cross member 120 by means of a plurality of bolts 510. Accordingly, by virtue of the coupling between the retractor 200 and the side frames 110 and the upper end cross member 120 by means of the bolts, it is possible to increase the total strength of the seat back frame 100 and the coupling strength of the retractor 200.

The retractor 200 includes a first mount unit 210 in which a pre-tensioner and a self-correction sensor are mounted, a second mount unit 220 which is positioned at one side based on the first mount unit 210 and in which a spool and a load limiter are mounted, and a third mount unit 230 which is positioned at the other side based on the first mount unit 210 and in which a pre-tensioner is mounted.

According to the present disclosure, the two headrest poles 300 respectively extend through the space between the first mount unit 210 and the second mount unit 220 and the space between the first mount unit 210 and the third mount unit 230 and are mounted thereto.

The retractor 200 may be composed of the combination of the pre-tensioner, the self-correction sensor, the spool, the load limiter, and the pre-tensioner.

The pre-tensioner is a device configured to instantaneously rewind a webbing to tighten the webbing upon collision of a vehicle, and the self-correction sensor is a device which is provided with an emergency locker to normally allow free movement of the webbing but to constrain the webbing in times of danger such as collision, emergency braking or overturn.

The spool is a device configured to wind and unwind the webbing, and the load limiter is a device configured to maintain resisting force applied to the webbing upon collision at a certain level and to gradually reduce the binding force of the webbing to relieve the impact applied to the chest of a passenger. The pre-tensioner is a device configured to instantaneously rewind the webbing to tighten the belt using a motor upon collision of a vehicle.

Referring to the drawings, the retractor 200 is formed so as to have the form of a rectangular parallelepiped which has a length in a lateral direction greater than a length in forward/backward direction. The first mount unit 210, which is positioned in the center of the inside of the retractor 200, is provided therein with the pre-tensioner and the self-correction sensor, the second mount unit 220, which is positioned to the left of the inside of the retractor 200, is provided therein with the spool and the load limiter, and the third mount unit 230, which is positioned to the right of the inside of the retractor 200, is provided therein with the pre-tensioner.

The webbing 600, which is wound around the spool of the second mount unit 220, may be taken outwards out of the retractor 200 through the left upper corner of the retractor 200 as indicated by the arrow MI by rotation of the spool.

The regions of the retractor 200 through which the headrest poles 300 extend may be surrounded and protected by retractor frames 240, as illustrated in FIG. 5.

The retractor frames 240 define the appearance of the retractor 200 and constitute the bone (framework) of the retractor 200.

According to the present disclosure, the retractor frames 240 may constrain the headrest poles 300 from the outside to maximally prevent deformation of the headrest poles 300 caused by external force applied thereto. Consequently, there is an advantage of preventing internal damage to the retractor 200 caused by the deformation of the headrest poles 300.

The vehicle seat according to the present disclosure further includes a webbing guide 700, which is rotatably coupled to one side of the upper end of the seat back frame 100 and through which the webbing 600 extends.

The webbing guide 700 including a D-ring 710 is rotatably coupled to one corner of the upper end of the seat back frame 100 via a bolt 520.

The bolt 520 is passed through the D-ring 710 of the webbing guide 700, and is threadedly coupled to the one corner of the upper end of the seat back frame 100. The webbing guide 700 is rotatable about the bolt 520.

Because a webbing guide included in a conventional seat back is a stationary structure which is not rotatable, a webbing which extends through the webbing guide is drawn out of the webbing guide only in one direction.

Consequently, the conventional stationary webbing guide is not capable of changing the direction in which the webbing is drawn out according to the body shape of a passenger sitting on the vehicle seat, whereby there is a disadvantage in that frictional force caused by the webbing increases, thus inconveniencing the passenger.

In contrast, since the webbing guide 700 according to the present disclosure is constructed so as to be rotatable about the bolt 520 at the one corner of the upper end of the seat back frame 100, it is possible to variously change the direction in which the webbing is drawn out according to the body type of a passenger sitting on the vehicle seat. Accordingly, there are advantages of reducing friction caused by the webbing 600 and of helping to improve ride quality.

The webbing guide 700 may be rotatably coupled to one corner of the upper end cross member 120, which constitutes the seat back frame 100, via the bolt 520.

FIG. 7 illustrates the initial state of the vehicle seat in which the webbing 600 is not worn by a passenger. In the initial state, the webbing 600 having passed through the webbing guide 700 is positioned to the left of a seat bolster 10.

FIG. 8 presumptively illustrates the state in which the webbing is worn by a passenger. When a passenger wears the webbing 600, the webbing guide 700 is rotated clockwise about the bolt 520 in the drawing, and the webbing 600 is drawn out of the vehicle seat in the inward direction of the seat back 20 which is the direction in which the webbing 600 is worn by the passenger sitting on the vehicle seat.

Meanwhile, when the passenger releases the worn state of the webbing 600, the webbing guide 700 and the webbing 600 is restored to the initial state shown in FIG. 7 due to rotation caused by the spring force of the retractor 200 and the weight of the webbing guide 700.

In the initial state in which the webbing 600 is not worn by a passenger, the webbing 600 having passed through the webbing guide 700 is positioned at the outer side of the seat bolster 10. Accordingly, because the webbing 600 is positioned at the lateral side of the vehicle seat when a passenger sits on the vehicle seat, there is an advantage of allowing the passenger to easily access the vehicle seat.

When the passenger wears the webbing 600, the webbing 600 is drawn out of the vehicle seat in the inward direction of the seat back 20 which is the direction in which the webbing 600 is worn by the passenger. Accordingly, there are advantages of reducing friction caused by the webbing 600 and of helping to improve ride quality.

According to the present disclosure, a webbing port 800 through which the webbing 600 moves is vertically formed through the upper end of the seat back frame 100.

The webbing port 800 may be formed through the upper end cross member 120 constituting the seat back frame 100, or may be formed through an additional bracket coupled to the upper end cross member 120.

The size of the hole in the webbing port 800 may be changed so as to have various dimensions in consideration of the shape of the vehicle seat and the body type of a passenger. The size of the webbing port 800 is preferably set to be maximized within such a range that the webbing 600, which is drawn through the webbing guide 700, does not interfere with the webbing port 800 in order to prevent damage to the webbing 600 caused by friction.

The hole in the webbing port 800 may be variously designed to have any of various shapes, such as a circular shape, a semicircular shape or a rectangular shape.

According to the present disclosure, the webbing port 800 may be formed at one or both of the right side and the left side of the upper end of the seat back frame 100.

In other words, the webbing port 800 may be formed at one of the right side and the left side of the upper end of the seat back frame 100 depending on whether a driver seat and a steering wheel are positioned at the right side or the left side of the vehicle, or may be formed both at the right side and the left side of the upper end of the seat back frame 100 so as to be used in common.

According to the embodiment of the present disclosure, a guide 810 is coupled to the periphery of the webbing port 800 in order to prevent direct contact between the webbing 600 and the webbing port 800.

Because the webbing port 800 is formed through the seat back frame 100 or the upper end cross member 120, which is made of steel, and the webbing 600 is made of cloth, damage to the webbing 600 may occur due to abrasion when the webbing 600 is frequently brought into contact with the webbing port 800 during drawing and retraction of the webbing 600.

In order to prevent undesired damage to the webbing 600, the present disclosure is designed to prevent direct contact between the webbing port 800 made of steel and the webbing 600. To this end, the guide 810, which is made of plastic material having low friction, is coupled to the periphery of the webbing port 800 so as to cause the guide 810 to be brought into contact with the webbing 600.

In the case in which a passenger sitting on the vehicle seat has a body size larger than the average size of adult humans, the front width D1 of the webbing port 800 is preferably equal to or larger than the rear width D2 of the webbing port 800, as illustrated in FIG. 11. In contrast, in the case in which a passenger sitting on the vehicle seat has a body size smaller than the average size of adult humans, the rear width D2 of the webbing port 800 is preferably greater than the front width D1 of the webbing port 800, as illustrated in FIG. 12.

The shape of the hole in the webbing port 800 may be changed according to an amount of rotation of the webbing guide 700 between the state in which a passenger does not wear the webbing 600 and the state in which the passenger wears the webbing 600.

In other words, in the case in which a passenger has a body size equal to or larger than the average size of adult humans, the front width D1 of the webbing port 800 is preferably greater than the rear width D2 of the webbing port 800 in consideration of a larger amount of rotation of the webbing guide 700.

In contrast, in the case in which a passenger has a body size smaller than the average size of adult humans, the rear width D2 of the webbing port 800 is preferably greater than the front width D1 of the webbing port 800 in consideration of a smaller amount of rotation of the webbing guide 700.

In this way, it is possible to maximally reduce the friction between the webbing port 800 and the webbing 600 by virtue of the size variation of the hole in the webbing port 800. Consequently, it is possible to allow the webbing 600 to be easily drawn out of the webbing port 800 and thus to improve the durability of the webbing 600.

As is apparent from the above description, since the vehicle seat according to the present disclosure is constructed such that the retractor 200 is received and mounted in the space beneath the upper end cross member 120 constituting the seat back frame 100 and the headrest poles 300 vertically extend through the retractor 200 and are mounted therein, there are advantages of thinning the seat back 20 and of widening the passenger compartment, thus improving ride quality.

Although the preferred embodiments of the present disclosure have been described above with reference to the accompanying drawings, those skilled in the art will appreciate that the present disclosure can be implemented in various other embodiments without changing the technical ideas or features thereof.

What is claimed is:

1. A vehicle seat comprising:
   a seat back frame constituting a framework of the vehicle seat;
   a retractor received in an internal space of the seat back frame; and
   headrest poles which vertically extend through the retractor and are mounted to the retractor,
   wherein the retractor comprises:
       a first mount unit on which a pre-tensioner is mounted;
       a second mount unit which is positioned at one side of the first mount unit; and
       a third mount unit which is positioned at another side of the first mount unit and on which another pre-tensioner is mounted, and
   wherein the headrest poles are respectively configured to extend through a space between the first mount unit and the second mount unit and a space between the first mount unit and the third mount unit.

2. The vehicle seat according to claim 1, wherein the retractor is arranged at an upper end of the seat back frame.

3. The vehicle seat according to claim 1, further comprising a retractor frame configured to surround and protect regions of the headrest poles which extend through the retractor.

4. The vehicle seat according to claim 1, wherein the seat back frame comprises a pair of side frames, which are laterally spaced apart from each other and extend vertically, and an upper end cross member configured to connect upper ends of the pair of side frames to each other in a lateral direction.

5. The vehicle seat according to claim 4, wherein the retractor is received in a space beneath the upper end cross member, and the retractor is fixedly coupled to the pair of side frames and the upper end cross member.

6. The vehicle seat according to claim 1, further comprising a webbing guide which is rotatably coupled to one side of the upper end of the seat back frame and through which a webbing extends.

7. The vehicle seat according to claim 6, wherein the webbing is configured to pass through the webbing guide so as to be positioned at an outer side of a seat bolster when the webbing is not worn by a passenger in an initial state.

8. The vehicle seat according to claim 7, wherein the webbing is configured to be drawn out of the vehicle seat in an inward direction due to rotation of the webbing guide when the webbing is worn by the passenger.

9. The vehicle seat of claim 8, wherein the webbing guide and the webbing are configured to be restored to the initial state by rotation of the webbing guide and the webbing when the worn state of the webbing is released.

10. The vehicle seat according to claim 1, wherein the seat back frame includes a webbing port formed through the upper end of the seat back frame.

11. The vehicle seat according to claim 10, wherein the webbing port includes at least one webbing port formed at a right side or a left side of the upper end of the seat back frame.

12. The vehicle seat according to claim 10, wherein the webbing port includes first and second webbing ports formed both at a right side and a left side of the upper end of the seat back frame.

13. The vehicle seat according to claim 10, wherein the webbing port has a front width greater than a rear width to accommodate a passenger sitting on the vehicle seat with a body size that is greater than or equal to an average body size.

14. The vehicle seat according to claim 10, wherein the webbing port has a rear width greater than a front width to accommodate a passenger sitting on the vehicle seat with a body size that is smaller than an average body size.

15. The vehicle seat according to claim 1, wherein a guide is coupled to a periphery of the webbing port so as to prevent direct contact between the webbing and the webbing port.

16. A vehicle comprising the vehicle seat according to claim 1.

17. A vehicle seat comprising:
   a seat back frame constituting a framework of the vehicle seat;
   a retractor received in an internal space of the seat back frame; and
   headrest poles which vertically extend through the retractor and are mounted to the retractor,
   wherein the retractor comprises:
       a first mount unit on which a pre-tensioner and a self-correction sensor are mounted;
       a second mount unit which is positioned at one side of the first mount unit and on which a spool and a load limiter are mounted; and
       a third mount unit which is positioned at another side of the first mount unit and on which another pre-tensioner is mounted, and
   wherein the headrest poles are respectively configured to extend through a space between the first mount unit and the second mount unit and a space between the first mount unit and the third mount unit.

\* \* \* \* \*